Figure 1:
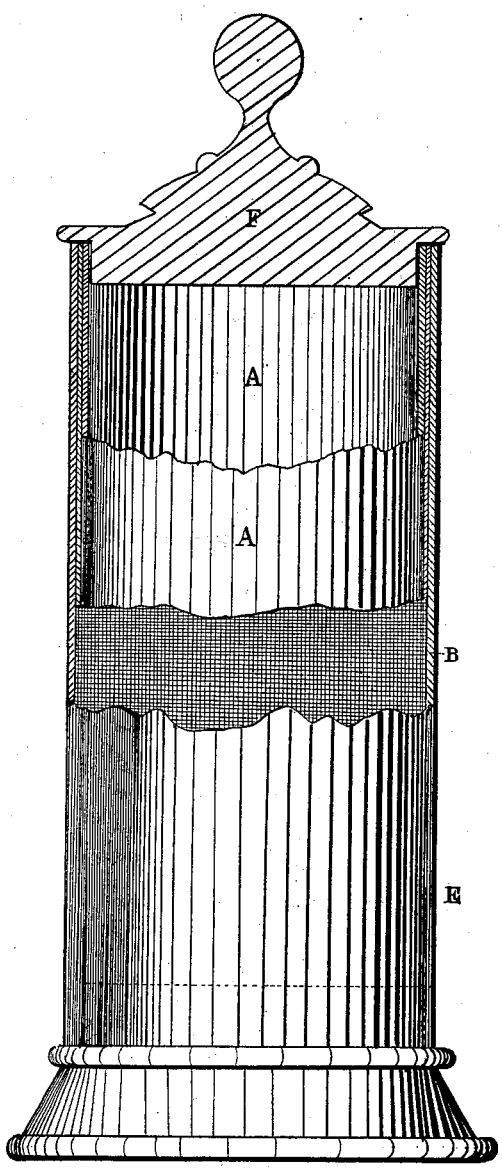

2 Sheets—Sheet 1.

W. GARDNER.
Canister.

No. 202,017. Patented April 2, 1878.

WITNESSES.

INVENTOR.
Wm Gardner.
per Edson Bros.
Attorneys

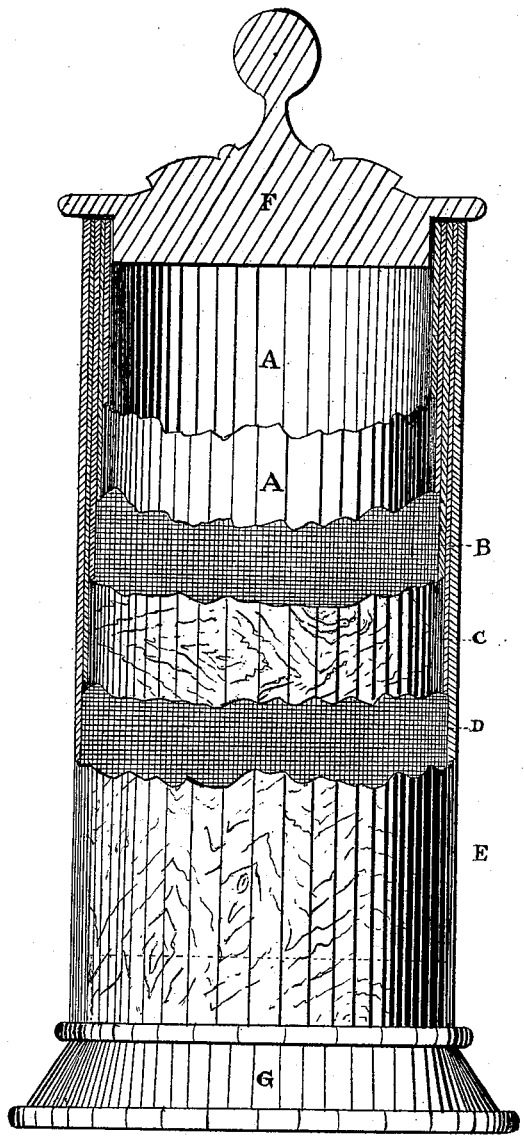

UNITED STATES PATENT OFFICE.

WILLIAM GARDNER, OF NEW YORK, N. Y.

IMPROVEMENT IN CANISTERS.

Specification forming part of Letters Patent No. 202,017, dated April 2, 1878; application filed February 7, 1878.

*To all whom it may concern:*

Be it known that I, WILLIAM GARDNER, of New York city, in the county of New York and State of New York, have invented certain new and useful Improvements in Canisters; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1, Sheet 1, is a view of my improved canister, partly in side elevation and partly in section, with its respective layers partly broken away; and Fig. 2, Sheet 2, represents a similar view of the same, re-enforced by additional layers of textile material and veneers, partly broken away.

The same part in the two figures is designated by the same letter.

This invention appertains to certain improvements in canisters; and it consists in constructing the same of one or more layers of veneer and textile material, and of layers of metal, textile material, and veneer, substantially as hereinafter more particularly set forth.

Referring to the annexed drawing, A marks the inner layer of my canister, which may be made of metal or veneer, and having its meeting or lapping edges beveled and suitably fastened together. The desired shape is imparted to the layer of metal A by bending the same around a slowly-rotating cylinder. Around the layer of metal A is wound a layer or layers of textile material, B—as, for instance, muslin, and the like—which is glued thereon. After the drying of the glued or cemented layer or layers B, a layer of veneer, C, is secured around the latter in like manner as in bending and securing the layer A.

The inner layer A, which may be made of metal or veneer, as above stated, may be re-enforced, as shown in Fig. 2, Sheet 2, at D and E, with additional layers of textile material and veneer, for heavy articles.

In some instances, where, for instance, not much strength is required, a layer of veneer may be substituted in lieu of the metal layer A without the re-enforcement above referred to. The grains of the veneer run in different directions.

The exterior layer of veneer, when desired, may be ornamented or configurated with transferred pictures.

Among other uses to which my invention is applicable may be mentioned the following: Umbrella-holders, vases, napkin-rings, cigar-holders, flower-pots, bread or cake and spice boxes, &c.

The layers of veneers, &c., when applied to the forming-cylinder, are bent in the direction of their longitudinal axes; and after formation into tubing, the latter is cut up into the required lengths, according to the size of the article to be made.

F is a cover, and G a bottom, supplied to the canister, which may be omitted when occasion requires.

What I claim is—

1. A tube composed of layers of metal, textile material, and veneer, fastened together, substantially as shown and described.

2. A receptacle consisting of two or more layers of veneer and an intermediate layer of textile material, glued together at their meeting or lapping edges, and the tubular receptacle thus formed provided with the bottom G and a metallic lining, substantially as set forth.

3. A receptacle consisting of two or more layers of veneer and an intermediate layer of textile material, glued together at their meeting or lapping edges, and the tubular receptacle thus formed provided with a cover, F, bottom G, and a metallic lining, substantially as set forth.

In testimony that I claim the foregoing as my own I hereunto affix my signature in presence of two witnesses.

WILLIAM GARDNER.

Witnesses:
DAVID THORNTON,
ADOLPH KIENDL.